US012117093B2

(12) United States Patent
Ohki

(10) Patent No.: US 12,117,093 B2
(45) Date of Patent: Oct. 15, 2024

(54) MANIFOLD SOLENOID VALVE AND VALVE BASE

(71) Applicant: KOGANEI CORPORATION, Koganei (JP)

(72) Inventor: Hirokazu Ohki, Tokyo (JP)

(73) Assignee: KOGANEI CORPORATION, Koganei (JP)

( * ) Notice: Subject to any disclaimer, the term of this patent is extended or adjusted under 35 U.S.C. 154(b) by 82 days.

(21) Appl. No.: 17/910,376

(22) PCT Filed: Feb. 18, 2021

(86) PCT No.: PCT/JP2021/006175
§ 371 (c)(1),
(2) Date: Sep. 9, 2022

(87) PCT Pub. No.: WO2021/182063
PCT Pub. Date: Sep. 16, 2021

(65) Prior Publication Data
US 2023/0137993 A1 May 4, 2023

(30) Foreign Application Priority Data
Mar. 11, 2020 (JP) .................... 2020-041518

(51) Int. Cl.
*F16K 27/00* (2006.01)
*F16K 27/02* (2006.01)
(Continued)

(52) U.S. Cl.
CPC ........ *F16K 31/0675* (2013.01); *F16K 27/003* (2013.01); *F16K 27/029* (2013.01); *H01F 7/081* (2013.01); *Y10T 137/87885* (2015.04)

(58) Field of Classification Search
CPC .... F16K 31/06; F16K 31/0675; F16K 27/003; F16K 27/029; Y10T 137/87885;
(Continued)

(56) References Cited
U.S. PATENT DOCUMENTS 5,495,871 A 3/1996 Meloche et al.
5,558,122 A 9/1996 Kawamura et al.
(Continued)

FOREIGN PATENT DOCUMENTS

JP H03-013664 Y2 3/1991
JP H08-035573 A 2/1996
(Continued)

OTHER PUBLICATIONS

International Search Report mailed on May 11, 2021, in connection with corresponding International Application No. PCT/JP2021/006175 (5 pp., including machine-generated English translation).
(Continued)

Primary Examiner — Matthew W Jellett
(74) Attorney, Agent, or Firm — McCormick, Paulding & Huber, PLLC

(57) ABSTRACT

A valve base 15 has: a valve base body 20 on which a pin insertion hole 65 and a board installing hole 38 are formed; a board assembly 42 having a board 43 provided with a plurality of output terminals and a board connector 44 provided with a plurality of input terminals; a plurality of coupling terminals provided on the board 43 at intervals and connected to the input terminals of the board connector 44 of another adjacent board assembly 42; an output wiring connecting the output terminals and the input terminals; and a coupling wiring connecting the coupling terminals to the input terminals. A plurality of output pins 61 to 63 constituting the output terminals are provided on the board assem- (Continued)

bly 42. A manifold solenoid valve is formed by a plurality of valve bases on which solenoid valves are mounted.

13 Claims, 13 Drawing Sheets

(51) Int. Cl.
*F16K 31/06* (2006.01)
*H01F 7/08* (2006.01)

(58) Field of Classification Search
CPC .... H01F 7/081; F15B 13/817; F15B 13/0839; F15B 13/0853; F15B 13/0857; F15B 13/0875
See application file for complete search history.

(56) References Cited

U.S. PATENT DOCUMENTS

| | | | | |
|---|---|---|---|---|
| 5,588,465 | A | 12/1996 | Witowski et al. | |
| 6,053,198 | A | 4/2000 | Atkin et al. | |
| 6,170,527 | B1* | 1/2001 | Hayashi | F16K 27/003 |
| | | | | 137/884 |
| 6,173,745 | B1* | 1/2001 | Hayashi | F16K 27/003 |
| | | | | 137/884 |
| 6,206,045 | B1* | 3/2001 | Hayashi | F15B 13/0839 |
| | | | | 137/884 |
| 6,213,153 | B1* | 4/2001 | Hayashi | F15B 13/0817 |
| | | | | 137/884 |
| 6,513,547 | B2* | 2/2003 | Endo | F15B 13/0817 |
| | | | | 137/884 |
| 6,830,067 | B2* | 12/2004 | Hayashi | F15B 13/0832 |
| | | | | 137/554 |
| 7,048,002 | B2* | 5/2006 | Hayashi | F15B 13/0857 |
| | | | | 137/884 |
| 7,849,881 | B2* | 12/2010 | Lee | F15B 13/085 |
| | | | | 137/884 |
| 8,905,071 | B2* | 12/2014 | Coombs | F15B 13/0853 |
| | | | | 137/884 |
| 2004/0003850 | A1 | 1/2004 | Miyazoe et al. | |
| 2009/0045367 | A1 | 2/2009 | Lee et al. | |

FOREIGN PATENT DOCUMENTS

| | | |
|---|---|---|
| JP | H10-103555 A | 4/1998 |
| JP | 2004-036841 A | 2/2004 |
| JP | 2010-174964 A | 8/2010 |

OTHER PUBLICATIONS

Extended European Search Report mailed Mar. 12, 2024, in connection with European Application No. 21766918.3; 13 pages.

* cited by examiner

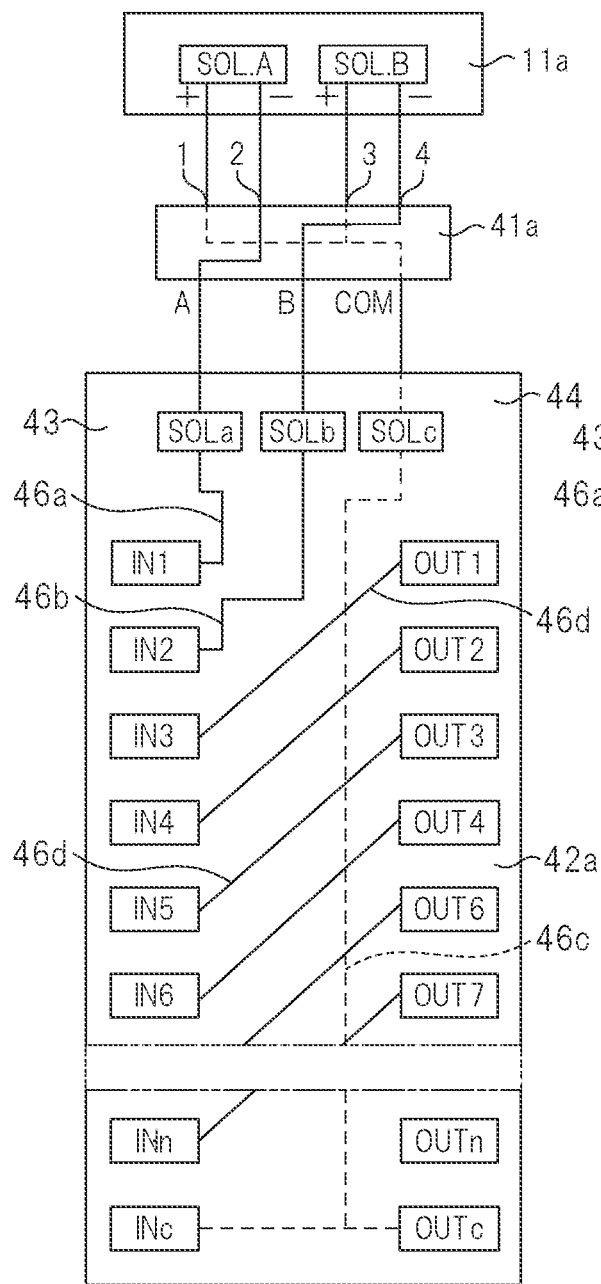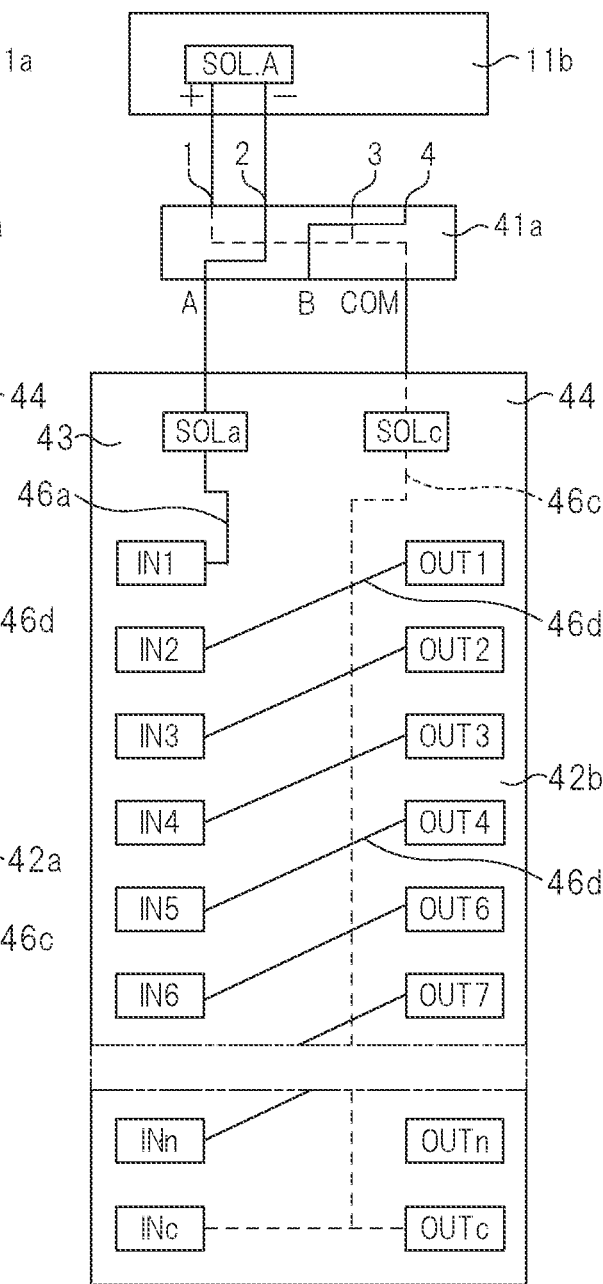

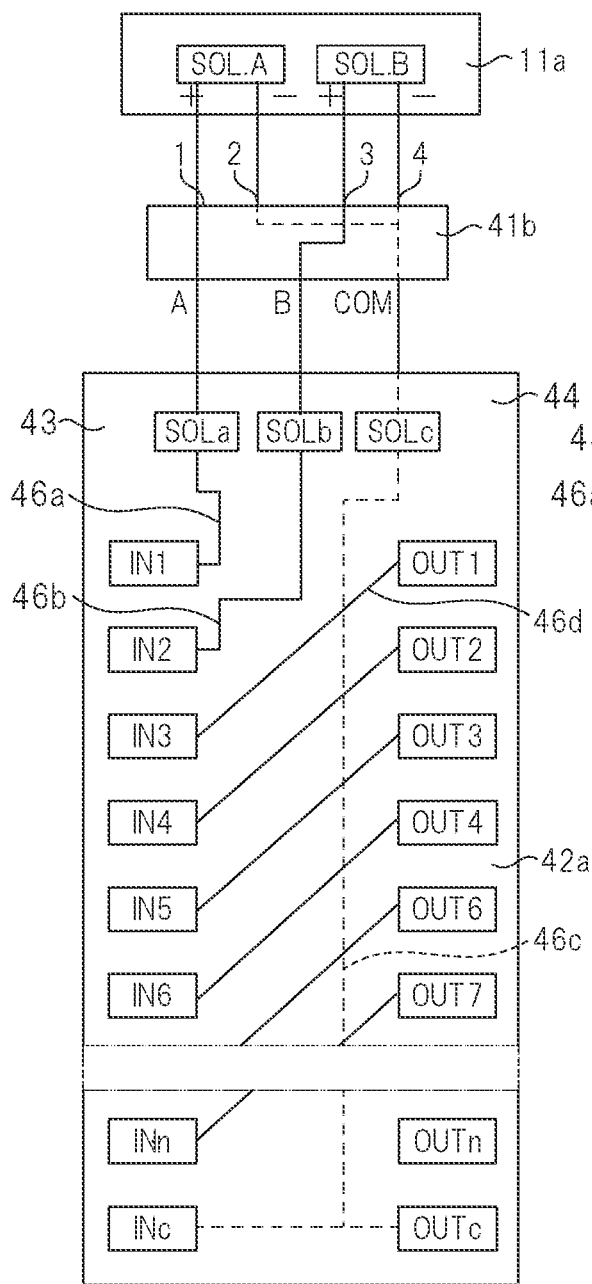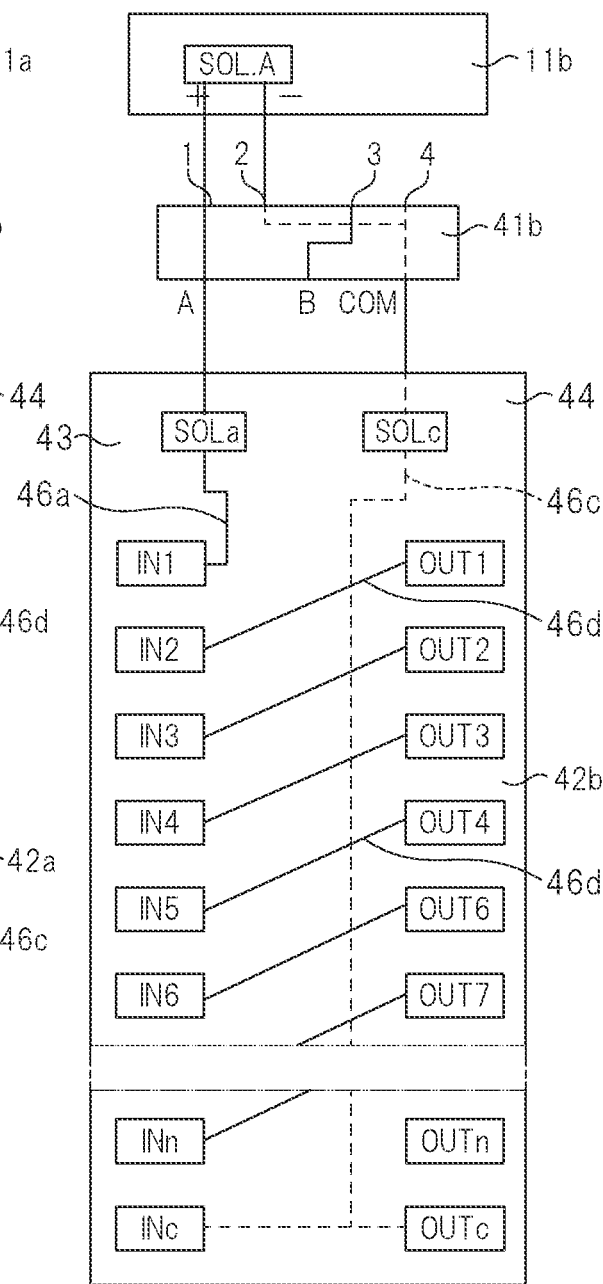

MANIFOLD SOLENOID VALVE AND VALVE BASE

CROSS-REFERENCE TO RELATED APPLICATIONS

This application is a National Stage application of International Patent Application No. PCT/JP2021/006175, filed on Feb. 18, 2021, which claims priority to Japanese Patent Application No. 2020-041518, filed on Mar. 11, 2020, each of which is hereby incorporated by reference in its entirety.

TECHNICAL FIELD

The present invention relates to a manifold solenoid valve and a valve base including a solenoid valve aggregate formed by aggregating a plurality of solenoid valves.

BACKGROUND

A solenoid valve assembly formed by assembling a plurality of solenoid valves is called a solenoid valve manifold or a manifold solenoid valve. As described in Patent Document 1, each solenoid valve includes: a valve housing, that is, a main valve block provided with a spool shaft, i.e., a main valve shaft for switching a flow path; and a solenoid block installed in the main valve block.

The solenoid valve manifold includes a split type in which a solenoid valve and a base block mounting the solenoid valve, i.e., a valve base are provided as a solenoid valve unit, the split type being obtained by aggregating the solenoid valve units. Patent Document 2 discloses a split type manifold solenoid valve. The solenoid valve units become an aggregated state and the aggregated state is attached to a support member called a DIN rail, or fastened by a screw member(s).

The solenoid valves include types of a single solenoid valve in which one solenoid is incorporated in the solenoid block and a double solenoid valve in which two solenoids are incorporated. The single solenoid valve drives the main valve shaft with one solenoid, and if application of a drive signal to the solenoid is stopped, the main valve shaft returns to an original position by a return force consisting of a spring force or air pressure. Even if the double solenoid valve stops applying the drive signal to one solenoid, the main valve shaft retains its original state until the drive signal is applied to the other solenoid. Patent Document 1 discloses the double solenoid valve.

In the manifold solenoid valve, there are two wiring specifications of: a positive common type in which a positive terminal of a coil is set at a common terminal, that is, a common terminal; and a negative common type in which a negative terminal of the coil is set at a common terminal.

A cable is connected to a wiring block of the manifold solenoid valve in order to apply the drive signal to each solenoid from an external controller. A board is attached to each valve base, and a printed wiring provided on the board has an output wiring for sending the drive signal to the solenoid and a coupling wiring for sending the drive signal to another adjacent board.

When a plug-in connector, that is, a relay connector is attached to the base block and the solenoid valve is attached to the valve base, a pin(s) of a connecting terminal provided on the solenoid valve is inserted into the relay connector. Patent Document 3 discloses a stacking type manifold solenoid valve used by joining a plurality of manifold bases, that is, valve bases. In order to connect a coupling terminal of each coupling wiring to an input terminal of a board provided on another adjacent base block, the adjacent boards are coupled by a connector member, and the coupling wiring of the adjacent board is connected.

Patent Document 1: Japanese Patent Application Laid-open No. H8-35573
Patent Document 2: Japanese Patent Application Laid-open No. 2010-174964
Patent Document 3: Japanese Patent Application Laid-open No. 2004-36841

SUMMARY

Problems to be Solved by the Invention

In a conventional manner, to assemble a stacking type manifold solenoid valve in which the board provided with the auxiliary connector is attached to the valve base and that electrically connects the relay connector and the auxiliary connector, the board and the auxiliary connector, which are separate parts, are required. Therefore, the number of parts of the manifold solenoid valve leads to increasing.

An object of the present invention is to provide a manifold solenoid valve and a valve base that are capable of reducing the number of parts.

Means for Solving the Problems

A manifold solenoid valve of the present invention having at least one solenoid valve unit that includes a solenoid valve provided with at least one solenoid and a valve base mounting the solenoid valve, the manifold solenoid valve including: a board provided with a plurality of output terminals that are electrically connected to a terminal of the solenoid; a board connector provided on the board and forming a board assembly by a combination with the board; a plurality of input terminals provided on the board assembly at intervals; a plurality of coupling terminals provided on the board assembly at intervals and connected to an input terminal of another adjacent board assembly; an output wiring provided on the board assembly and connecting the output terminals and the input terminals; and
  a coupling wiring provided on the board assembly and connecting the coupling terminals to the input terminals, wherein a plurality of output pins that are inserted into a pin insertion hole formed in the valve base and that form the output terminals are provided on the board assembly.

A valve base of the present invention forming a manifold solenoid valve that solenoid valves each provided with at least one solenoid are mounted on, the solenoid valves being stricken against each other, the valve base including: a valve base main body on which a solenoid valve mounting face, a pin insertion hole, a board installing hole penetrating in a width direction are formed; a board assembly having a board provided with a plurality of output terminals electrically connected to a terminal of the solenoid and a board connector provided on the board, and attached to the board installing hole; a plurality of input terminals provided on the board assembly at intervals; a plurality of coupling terminals provided on the board assembly at intervals and connected to the input terminals provided on another adjacent board assembly; an output wiring provided on the board assembly and connecting the output terminals and the input terminals; and a coupling wiring provided on the board assembly and connecting the coupling terminals to the input terminals, wherein a plurality of output pins inserted into the pin insertion hole and forming the output terminals are provided on the board assembly.

Effects of the Invention

The board assembly attached to the valve base is formed by the board and the board connector, the board is provided with the plurality of input terminals, the board connector is provided with the plurality of coupling terminals, and the solenoid terminal to which the terminal of the solenoid is coupled via the relay connector is connected to the input terminals by the output wiring. The output terminal is formed by an output pin that is a pin member and, by attaching the board assembly to the valve base, the output pin is inserted into the pin insertion hole of the valve base, and the output pin is electrically connected to the solenoid terminal. Since the output pin supported by the valve base is provided on the board, the valve base can be manufactured with the small number of parts.

BRIEF DESCRIPTION OF THE DRAWINGS

FIGS. 8(A) and 8(B) are both connection diagrams of a plus common type solenoid valve and a board assembly, FIG. 8(A) shows a double solenoid valve, and FIG. 8(B) shows a single solenoid valve;

FIGS. 9(A) and 9(B) are both connection diagrams of a minus common type solenoid valve and a board assembly, FIG. 9(A) shows a double solenoid valve, and FIG. 9(B) shows a single solenoid valve;

FIGS. 10(A), 10(B) and 10(C) are views in which FIG. 10(A) is a plan view showing a state where two board assemblies are combined, FIG. 10(B) is a cross-sectional view taken along line 10B-10B in FIG. 10(A), and FIG. 10(C) is a cross-sectional view showing a portion similar to FIG. 10(B) in a state of separating the two board assemblies;

FIGS. 12(A) and 12(B) are both views in which FIG. 12(A) is a side view of the valve base, and FIG. 12(B) is a cross-sectional view taken along line 12B-12B in FIG. 12(A)

DETAILED DESCRIPTION

Figure 1:
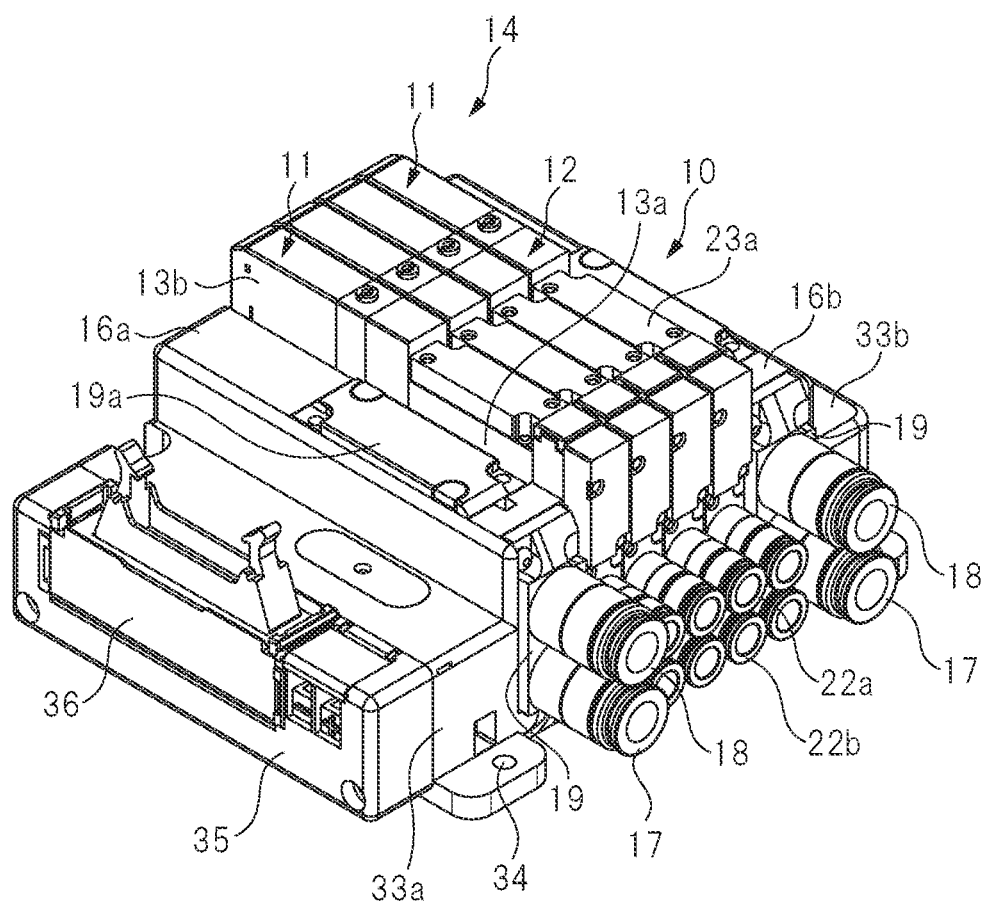
FIG. 1 is a perspective view showing a front side of a manifold solenoid valve according to one embodiment.
Figure 2:
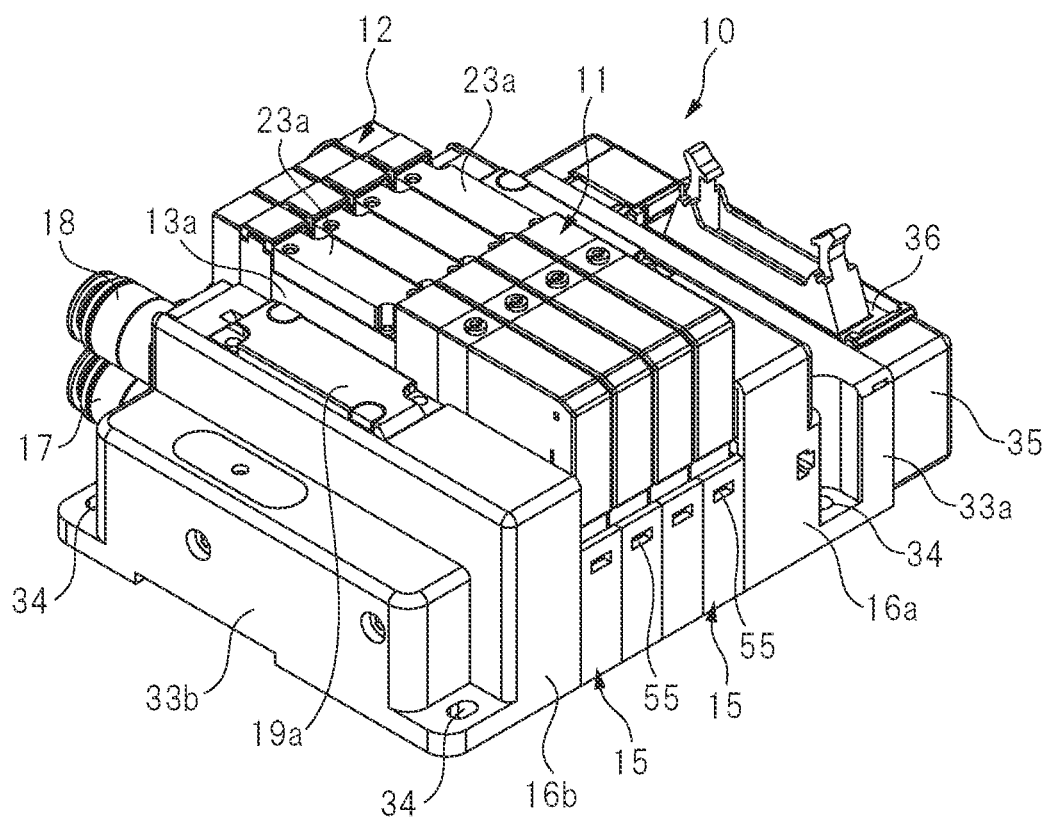
FIG. 2 is a perspective view showing a back side of FIG. 1.

Hereinafter, embodiments of the present invention will be described in detail with reference to the drawings. A manifold solenoid valve 10 shown in FIGS. 1 and 2 has a solenoid valve aggregate 12 formed by aggregating four solenoid valve units 14, each of which has a valve base 15 mounting a solenoid valve 11, and is a stacking type. The solenoid valve 11 has a main valve block 13a and a solenoid block 13b installed on the main valve block 13a. The solenoid valve aggregate 12 is formed by striking respective valve bases 15 of the solenoid valve units 14 against each other. Incidentally, the number of solenoid valve units 14 constituting the solenoid valve aggregate 12 in FIGS. 1 and 2 is one example, and the manifold solenoid valve 10 can be assembled by configuring the solenoid valve aggregate 12 with the arbitrary number of solenoid valve units 14.

Piping blocks 16a, 16b are stricken against both ends of the solenoid valve aggregate 12, and the solenoid valve aggregate 12 is installed on the piping blocks 16a, 16b. A joint plate 19 provided with a supply port 18 and an exhaust port 17 is attached to each of the piping blocks 16a, 16b. The supply port 18 is connected to an air supply source via a pipe (not shown). Connected to the exhaust port 17 is a unshown discharge pipe or silencer as needed. If the discharge pipe and silencer are unnecessary, nothing may be connected to the exhaust port 17. A lid member 19a having the same shape as the joint plate 19 is detachably attached to surfaces of the piping blocks 16a, 16b, and when the lid member 19a and the joint plate 19 are replaced, the supply port 18 and the exhaust port 17 become a form of being installed on the surfaces of the piping block 16a, 16b.

Figure 3:
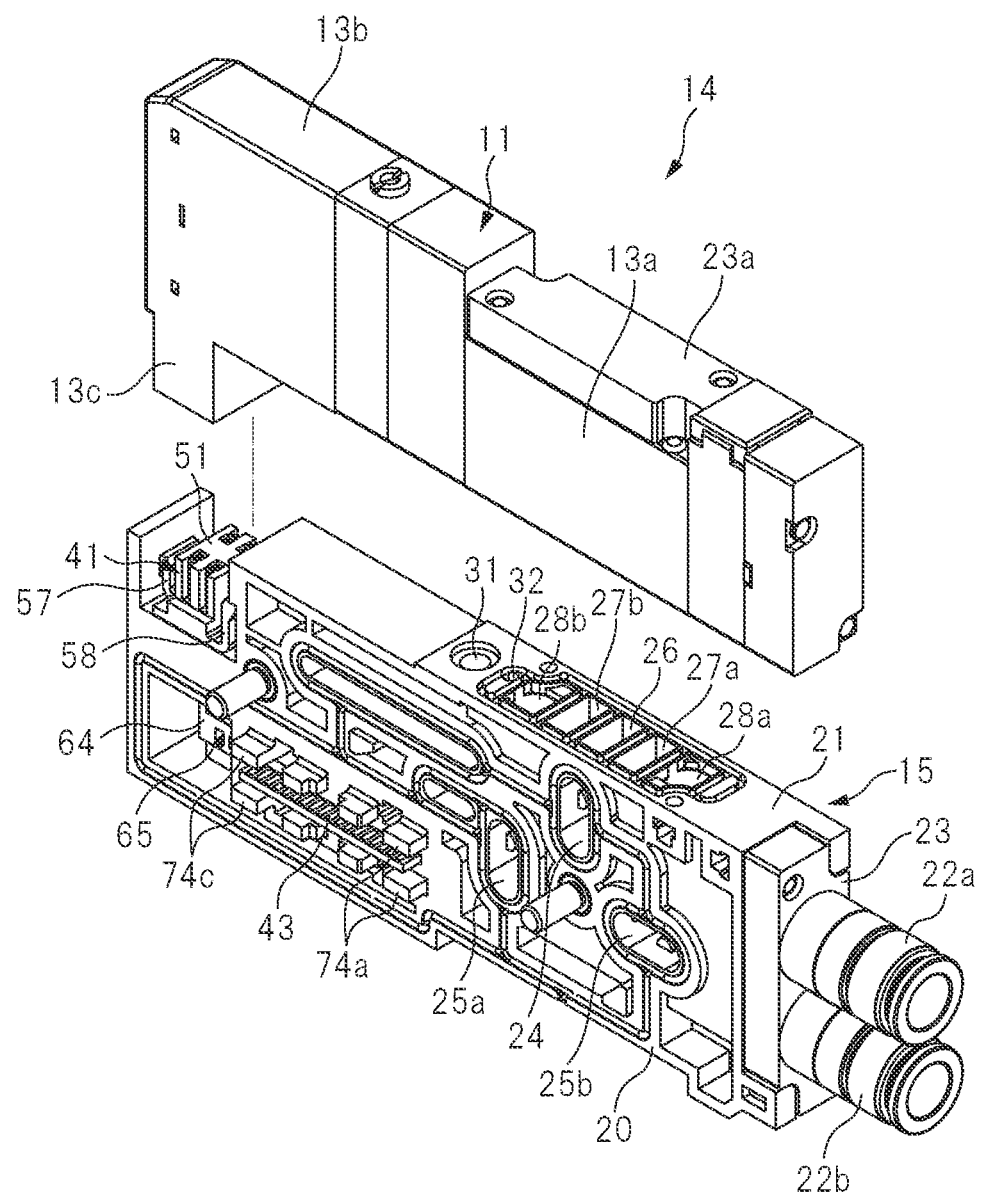
FIG. 3 is an exploded perspective view which looks at a solenoid valve unit from the front side.
Figure 4:
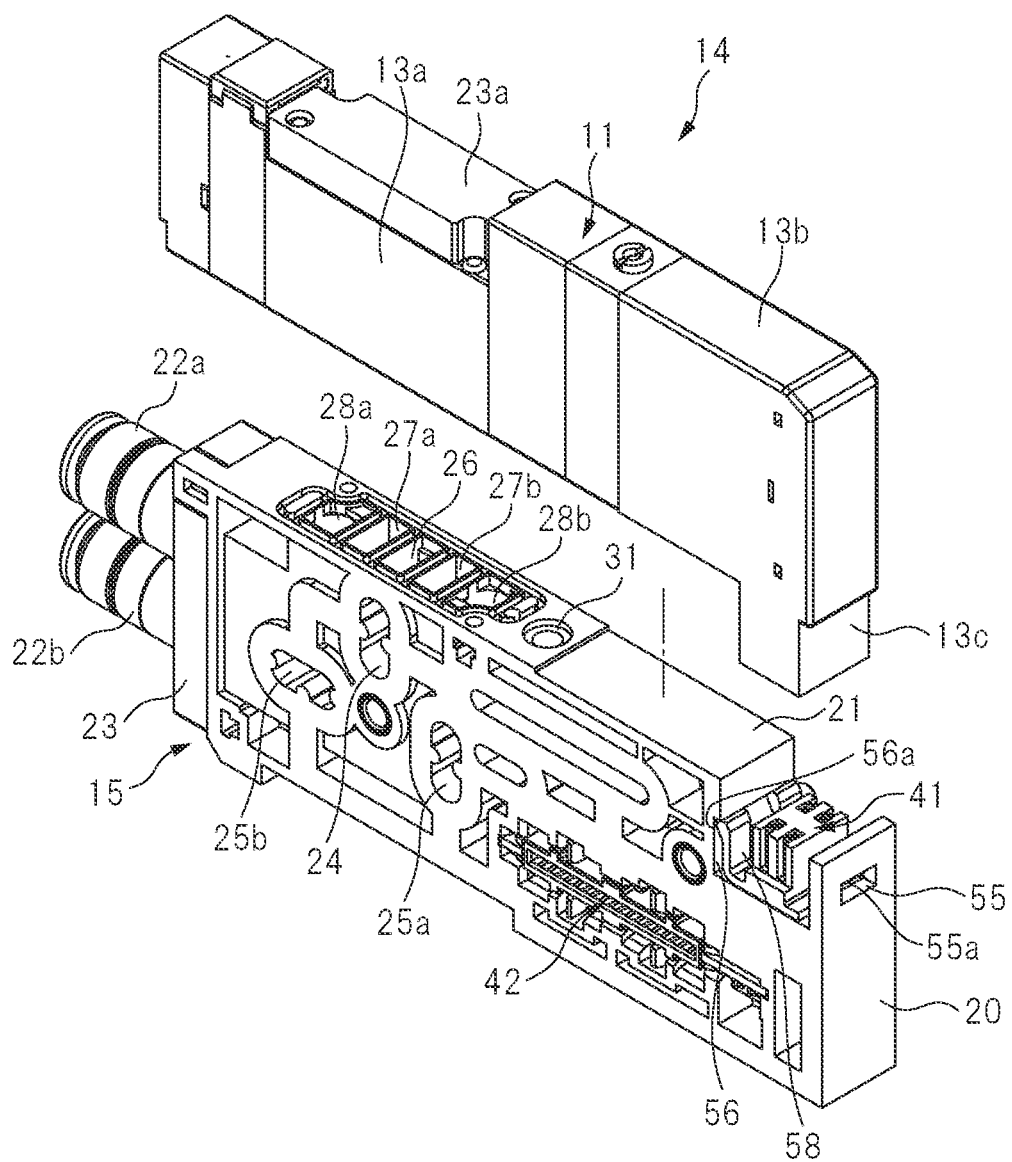
FIG. 4 is an exploded perspective view which looks at the solenoid valve unit from the back side.

As shown in FIGS. 3 and 4, the valve base 15 has: a valve base main body 20 shaped into a substantially rectangular parallelepiped shape by a resin; a joint plate 23 installed on the valve base main body 20; and a relay connector 41 and a board assembly 42 that are attached to the valve base main body 20. A solenoid valve mounting face 21 is provided on a surface of the valve base main body 20, and the solenoid valve 11 is mounted on the solenoid valve mounting face 21. The joint plate 23 provided with two output ports 22a, 22b is installed on a front surface of each valve base main body 20, and the respective output ports 22a, 22b are connected to a pneumatically operated device by piping.

As shown in FIGS. 3 and 4, formed in the valve base main body 20 are a supply hole 24 and two exhaust holes 25a, 25b. When the plurality of valve bases 15 are stricken, the plurality of supply holes 24 form a supply passage in a valve base aggregate and the plurality of exhaust holes 25a form a first exhaust flow path and the plurality of exhaust holes 25b form a second exhaust flow path. The supply passage communicates with the supply port 18, and each exhaust flow path communicates with the exhaust port 17.

Figure 5:
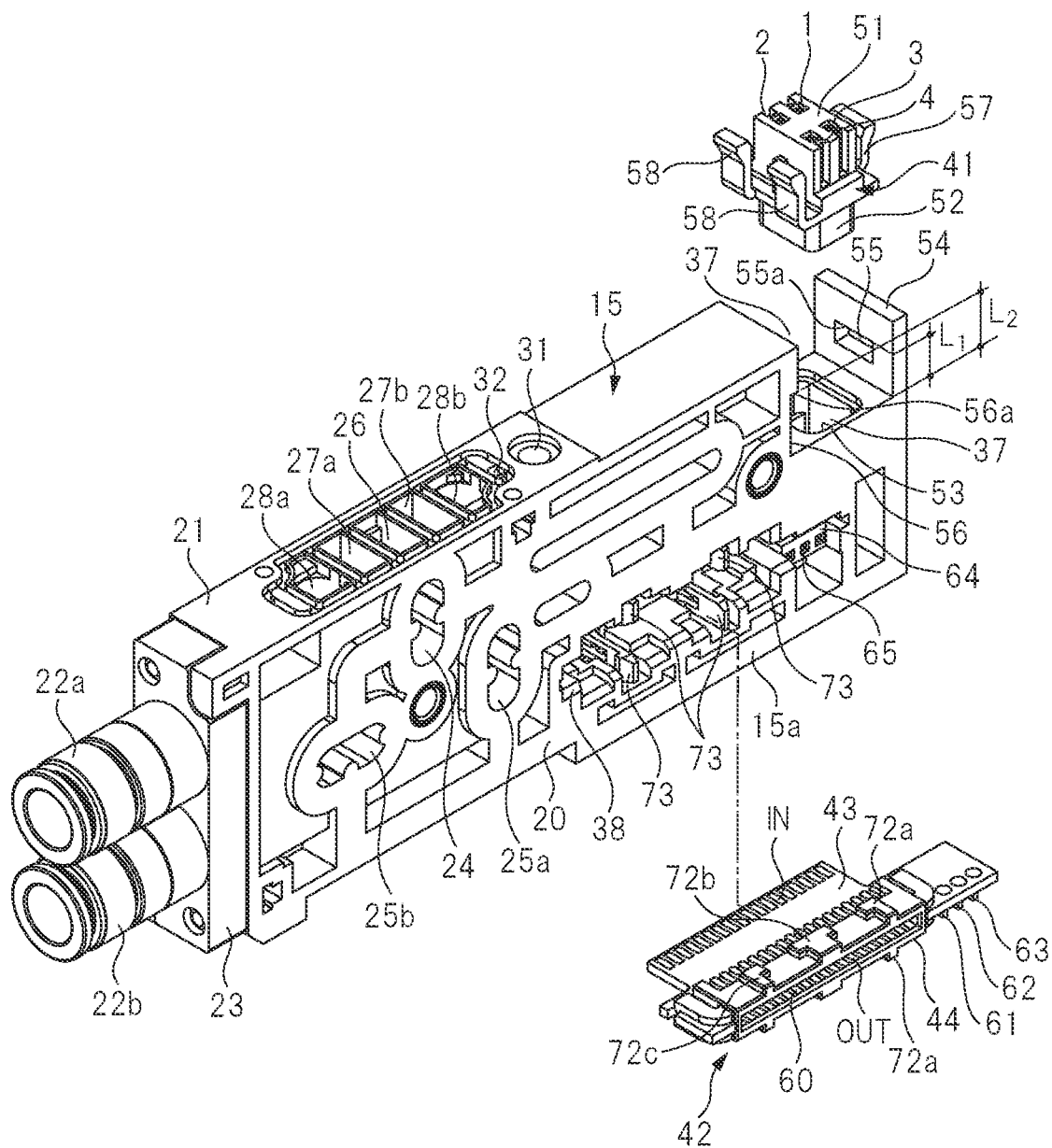
FIG. 5 is an enlarged perspective view which looks at a valve base from the front side.

As shown in FIG. 5, a supply communication hole 26 that opens on the solenoid valve mounting face 21 is provided in the valve base main body 20, and the supply communication hole 26 communicates with the supply hole 24. Two output communication holes 27a, 27b are provided on both sides of the supply communication hole 26, the output communication hole 27a communicates with the output port 22a, and the output communication hole 27b communicates with the output port 22b. An exhaust communication hole 28a is provided adjacent to the output communication hole 27a, an exhaust communication holes 28b is provided adjacent to the output communication hole 27b, and the respective exhaust communication holes 28a, 28b communicate with the exhaust port 17 via the exhaust holes 25a, 25b.

The main valve block 13a has an input port communicating with the supply communication hole 26, two output ports communicating with the respective output communication holes 27a, 27b, and two exhaust ports communicating with the exhaust communication holes 28a, 28b. These ports are omitted in the figures. A main valve shaft (not shown) is incorporated in the main valve block 13a. The main valve shaft switches a flow path at a position of causing the supply communication hole 26 of the valve base 15 to communicate with one output communication hole 27a and of supplying compressed air to the output port 22a and at a position of causing the supply communication hole 26 to communicate with the other output communication hole 27b and of supplying compressed air to the output port 22b. When the output communication hole 27a communicates with the output port 22a, the output port 22b communicates with the exhaust communication hole 28b. When the output communication hole 27b communicates with the output port 22b, the output port 22a communicates with the exhaust communication hole 28a.

Since the manifold solenoid valve 10 includes two piping blocks 16a, 16b, it can supply compressed air from the two supply ports 18 to the supply holes 24. However, only one of the two piping blocks 16a, 16b may be provided. The lid member 23a having the same shape as the joint plate 23 is detachably attached to a surface of the main valve block 13a, and when the lid member 23a and the joint plate 23 are replaced, the manifold solenoid valve 10 becomes such a form that the output ports 22a, 22b are installed on the valve block 13a.

At least one solenoid, i.e., a coil is incorporated in the solenoid block 13b. Pilot air is supplied to a piston provided on the main valve shaft by a drive signal supplied to the solenoid, and the main valve shaft is driven in an axial direction. In this way, the solenoid valve 11 is an indirect actuated type that has a pilot solenoid valve. An exhaust communication hole 31 for pilot air to discharge the pilot air, which is supplied to the piston of the main valve shaft, is provided in the valve base main body 20, and the exhaust communication hole 31 communicates with a pilot port provided in the main valve block 13a. When the solenoid valve 11 is an external pilot type, a supply communication hole 32 for pilot air is provided in the valve base 15 in order to supply pilot air to the piston from exteriorly.

As shown in FIGS. 1 and 2, an end block 33a is integrally provided with the piping block 16a, and an end block 33b is integrally provided with the piping block 16ba. By installing a screw member to an installing hole 34 provided in each of the end blocks 33a, 33b, the manifold solenoid valve 10 can be installed on a support base (not shown). Further, by fixing the end blocks 33a, 33b to a DIN rail (not shown), the manifold solenoid valve 10 can be installed on the DIN rail.

As shown in FIG. 1, a power supply block 35 is installed on the end block 33a. The power supply block 35 includes a connector bracket 36 to which a cable connected to an external controller is connected, and a connector (not shown) provided on the connector bracket 36 is electrically connected to a solenoid incorporated in each solenoid block 13b. Consequently, the drive signal from the controller is applied to each solenoid, and supply of compressed air to a pneumatically operated device is controlled by a flow path switching movement due to the main valve shaft.

As shown in FIGS. 3 to 5, a connector accommodating portion 37 is formed so as to open to the solenoid valve mounting face 21 on a back side of the valve base main body 20. Further, a board installing hole 38 is formed in the valve base main body 20, and the board installing hole 38 penetrates in a width direction of the valve base main body 20. When the relay connector 41 is attached into the connector accommodating portion 37 and the solenoid valve 11 is arranged on the solenoid valve mounting face 21 of the valve base 15, a fitting portion 13c provided with a solenoid terminal is fitted to the relay connector 41.

The board assembly 42 is inserted into the board installing hole 38 from its one side and is installed on the valve base main body 20. The board assembly 42 includes a board 43 and a board connector 44, and the board assembly 42 is formed by combining the board 43 and the board connector 44. When the valve base 15 to which the board assembly 42 is attached is stricken against another valve base at their side surfaces, it is attached to a board connector 44 of another adjacent valve base 15, and an input terminal provided on the board 43 is connected to a coupling terminal of another adjacent board connector 44. Consequently, the wirings provided in the board assemblies 42 by linking all the board assembles 42 are connected, and the drive signal from the controller is applied to each solenoid.

The solenoid valve 11 has specifications of a single solenoid valve incorporating a single solenoid and a double solenoid valve incorporating two solenoids, and the manifold solenoid valve 10 has a form that includes any one of the solenoid valves 11 having a single solenoid valve and a double solenoid valve or a form in which both are mixed. Further, the wiring specification of the manifold solenoid valve 10 includes a positive common type in which a positive side terminal of a solenoid, that is, a coil is a common terminal, and a negative common type in which a negative side terminal thereof is a common terminal.

FIG. 8 is a wiring diagram of a solenoid valve and a board assembly when a wiring specification is a plus common type, (A) showing a case where the solenoid valve is a double solenoid valve, and (B) showing a case where the solenoid valve is a single solenoid valve. Meanwhile, FIG. 9 is a connection diagram of a solenoid valve and a board assembly when a wiring specification is a minus common valve, (A) showing a case where the solenoid valve is a double solenoid valve, and (B) showing a case where the solenoid valve is a double solenoid valve.

In FIGS. 8 and 9, regarding the solenoid valve 11, the double solenoid valve is shown by the reference numeral 11a and the single solenoid valve is shown by the reference numeral 11b. Regarding the relay connector 41, the plus common type is shown by the reference numeral 41a (first relay connector), and the minus common type is shown by the reference numeral 41b (second relay connector). Further, regarding the board assembly 42, the board assembly 42 of the double solenoid valve is shown by the reference numeral 42a, and the board assembly of the single solenoid valve is shown by the reference numeral 42b. In FIGS. 8 and 9, a wiring pattern including the board 43 and the board connector 44 is schematically shown.

The double solenoid valve 11a has a positive and a negative side solenoid terminal of each of a first solenoid SOL.A and a second solenoid SOL.B, and has a total of four solenoid terminals. The single solenoid valve 11b has a positive and a negative side solenoid terminal of the single solenoid SOL.A, and has a total of two solenoid terminals.

The relay connectors 41a, 41b have four solenoid-side connection portions 1 to 4 to which the solenoid terminals are connected.

As shown in (A) of FIG. 8, the plus common type relay connector 41a connected to the double solenoid valve 11a has a first board-side connection portion A connected to the solenoid-side connection portion 2. This board-side connection portion A is electrically connected to one solenoid terminal (minus terminal) of the first solenoid SOL.A via a first internal wiring. The relay connector 41a has a second board-side connection portion B connected to the solenoid-side connection portion 4. This board-side connection portion B is electrically connected to one solenoid terminal (minus terminal) of the second solenoid SOL.B via a second internal wiring. The relay connector 41*a* has a common board-side connection portion COM (common connection portion COM) which is a common connection portion connected to the two solenoid-side connection portions 1, 3. This board-side connection portion COM is electrically connected to the other solenoid terminal (plus side) of each of the first solenoid SOL.A and the second solenoid SOL.B via a third internal wiring.

As shown in (B) of FIG. 8, when the relay connector 41*a* is connected to the single solenoid valve 11*b*, one solenoid terminal (minus side) of the solenoid SOL.A is connected to the solenoid-side connection portion 2 and the board-side connection portion A is electrically connected to one solenoid terminal (minus terminal) of the solenoid SOL.A via the internal wiring. The other solenoid terminal (plus side) of the solenoid SOL.A is connected to the solenoid-side connection portion 1, and the common board-side connection portion COM is electrically connected to the other solenoid terminal (plus side) of the solenoid SOL.A via the internal wiring.

The relay connector 41*a* connected to the single solenoid valve 11*b* does not require the board-side connection portion B and the internal wiring connected to it. Therefore, the relay connector 41*a* connected to the single solenoid valve 11*b* may have or may not have the board-side connection portion B and the internal wiring connected to it.

As shown in (A) of FIG. 9, the minus common type relay connector 41*b* connected to the double solenoid valve 11*a* has a first board-side connection portion A connected to the solenoid-side connection portion 1. This board-side connection portion A is electrically connected to one solenoid terminal (plus terminal) of the first solenoid SOL.A via the first internal wiring. The relay connector 41*b* has a second board-side connection portion B connected to the solenoid-side connection portion 3. This board-side connection portion B is electrically connected to one solenoid terminal (plus terminal) of the second solenoid SOL.B via the second internal wiring. The relay connector 41*b* has a common board-side connection portion COM that is a common connection portion connected to the two solenoid-side connection portions 2, 4. This board-side connection portion COM is electrically connected to the other solenoid terminal (minus side) of each of the first solenoid SOL.A and the second solenoids SOL.B via the third internal wiring.

As shown in (B) of FIG. 9, when the relay connector 41*b* is connected to the single solenoid valve 11*b*, one solenoid terminal (plus side) of the solenoid SOL.A is connected to the solenoid-side connection portion 1 and the board-side connection portion A is electrically connected to one solenoid terminal (plus terminal) of the solenoid SOL.A via the internal wiring. The other solenoid terminal (minus side) of the solenoid SOL.A is connected to the solenoid-side connection portion 2. The common board-side connection portion COM is electrically connected to the other solenoid terminal (minus side) of the solenoid SOL.A via the internal wiring.

The relay connector 41*b* connected to the single solenoid valve 11*b* does not require the board-side connection portion B and the internal wiring connected to it. Therefore, the relay connector 41*b* connected to the single solenoid valve 11*b* may have or may not have the board-side connection portion B and the internal wiring connected to it.

As shown in (A) of FIG. 8 and (A) of FIG. 9, the plus common type 41*a* and the minus common type 41*b* of the relay connector 41 are different from each other in an internal wiring structure. By preparing two different types of internal wiring structures, resin parts of both relay connectors 41*a*, 41*b* are shared, and the both relay connectors 41*a*, 41*b* can be manufactured by using one type of resin molding die.

As shown in (B) of FIG. 8 and (B) of FIG. 9, the board assembly 42*a* with the double wiring of the double solenoid valve 11*a*: has a first output terminal SOLa connected to the first board-side connection portions A of the relay connectors 41*a*, 41*b*; a second output terminal SOLb connected to the second board-side connection portions B; and a third output terminal SOLc which is a common output terminal connected to the common board-side connection portion COM. These output terminals are provided at an end(s) of the board assembly 42*a*.

As shown in FIGS. 8(B) and 9(B), the board assembly 42*b* with the single wiring of the single solenoid valve 11*b* has: a first output terminal SOLa connected to the first board-side connection portions A of the relay connectors 41*a*, 41*b*; and a second output terminal SOLc which is a common output terminal connected to the common board-side connection portion COM. These output terminals are provided at an end(s) of the board assembly 42*b*.

A large number of input terminals IN1 to INn are provided linearly on the board 43 at regular intervals, and a common coupling terminal INc is provided on the board 43 adjacent to an n-th input terminal INn. The number n of input terminals is set according to the maximum number of solenoid valves 11 constituting one set of manifold solenoid valves 10. One side of each of the board assemblies 42*a*, 42*b* is a board connector 44. A large number of coupling terminals OUT1 to OUTn are provided linearly on the board connector 44 at regular intervals, and the common coupling terminal OUTc is provided on the board connector 44 adjacent to an n-th coupling terminal OUTn. The number n of coupling terminals is the same as the number of input terminals.

In the board assembly 42*a* of the double solenoid valve 11*a*, the first output terminal SOLa is connected to the first input terminal IN1 by an output wiring 46*a*, and the input terminal IN1 is connected to the first board-side connection portion A. The second output terminal SOLb is connected to the second input terminal IN2 by an output wiring 46*b*, and the input terminal IN2 is connected to the second board-side connection portion B. The common output terminal SOLc is connected to the common input terminal INc and the common coupling terminal OUTc by a common coupling wiring 46*c* having a broken line. The first to n–2nd coupling terminals OUT1 to OUTn–2 are connected to the third and subsequent input terminals IN3 to INn by a coupling wiring 46*d*, respectively.

Meanwhile, in the board assembly 42*b* of the single solenoid valve lib, the first output terminal SOLa is connected to the first input terminal IN1 by the output wiring 46*a*, and the input terminal IN1 is connected to the first board-side connection portion A. The common output terminal SOLc is connected to the common input terminal INc and the common coupling terminal OUTc by the common coupling wiring 46*c* having a broken line. The first to n–1th coupling terminals OUT1 to OUTn–1 are connected to the second and subsequent input terminals IN2 to INn by a coupling wiring 46*d*, respectively. The coupling terminals of the respective board assemblies 42*a*, 42*b* come into contact with the input terminal of another adjacent board assembly. In this way, the board assembly 42*a* and the board assembly 42*b* have different wiring patterns.

As shown in FIG. 5, the relay connector 41 has a connector main body 51 provided with solenoid-side connection portions 1 to 4 to which the solenoid terminals are connected. The board-side connection portions A, B, COM are provided on a base portion 52 of the connector main body 51 so as to be located on opposite sides of the solenoid-side connection portions 1 to 4. The base 52 of the relay connector 41 is installed to the installing hole 53 provided in the valve base main body 20.

Figure 7:
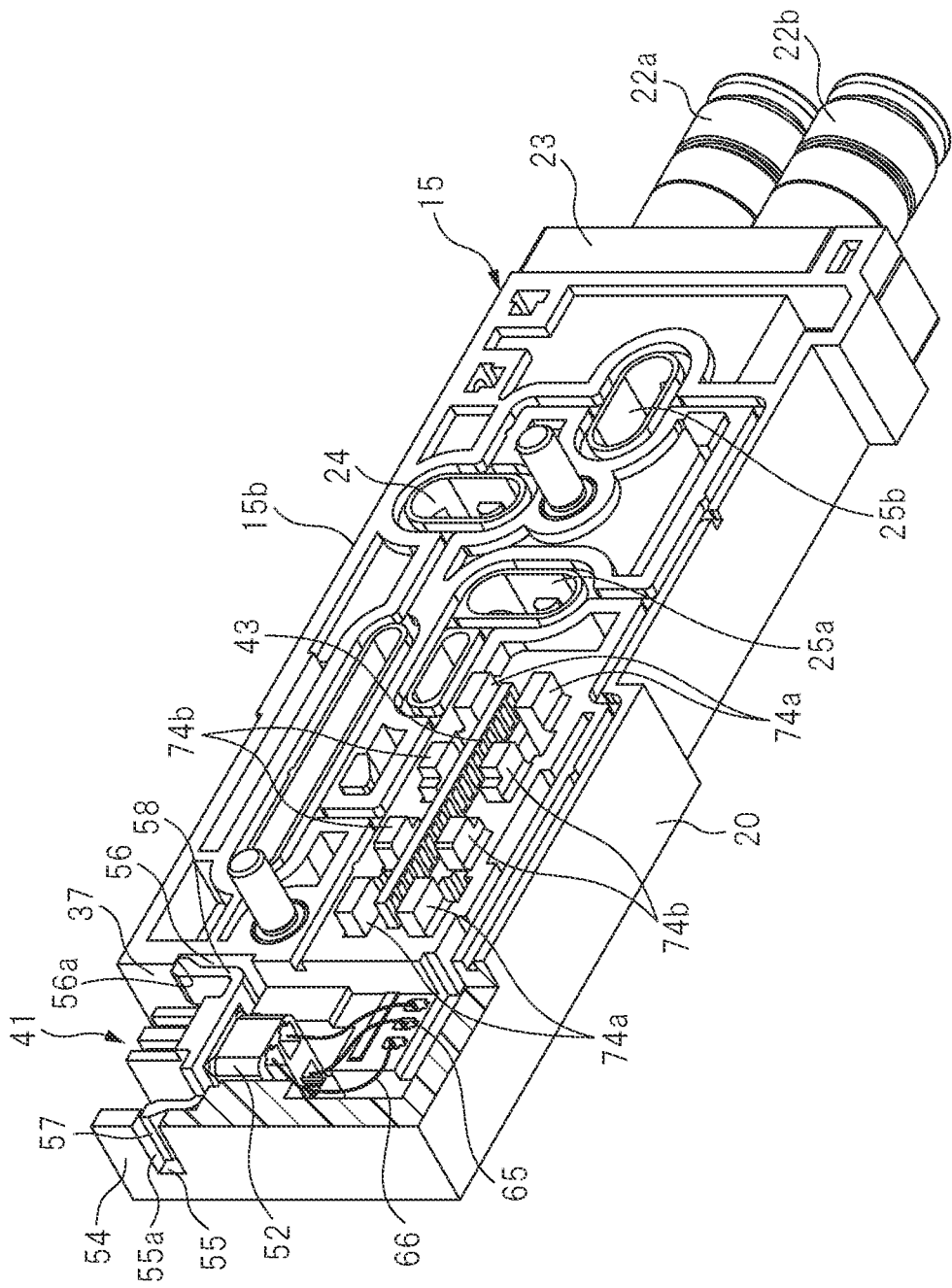
FIG. 7 is a partially cutaway perspective view showing the valve base in a state where a relay connector is installed.

As shown in FIGS. 5 and 7, an end wall portion 54 is provided on a back surface side of the valve base main body 20. A through hole 55 is formed in the end wall portion 54, and the through hole 55 penetrates the end wall portion 54 and causes the connector accommodating portion 37 to communicate with an outside of the valve base main body 20. An engaging recess 56 is formed in the valve base main body 20 so as to oppose the through hole 55. The relay connector 41 has an exposed claw 57 inserted into the through hole 55, and an engaging claw 58 engaged with the engaging recess 56. Therefore, when the relay connector 41 is inserted into the connector accommodating portion 37 and the base portion 52 is installed on the installing hole 53, the exposed claw 57 enters the through hole 55 and the engaged claw 58 is engaged with the engaging recess 56. Consequently, the relay connector 41 is prevented from coming off from the connector accommodating portion 37, and the exposed claw 57, which is a part of the relay connector 41, is exposed exteriorly from the through hole 55.

As described above, the specification of the solenoid valve 11 constituting the manifold solenoid valve 10 include the double solenoid valve 11a and the single solenoid valve 11b, and the wiring specification of the manifold solenoid valve 10 includes the plus common type and the minus common type. Besides those, the solenoid valve and the manifold solenoid valve also have other specifications such as waterproof and explosion-proof. A shape of the relay connector 41 may differ depending on the specifications. By making at least a shape, a pattern, and color of a portion exposed from the through hole 55 of the relay connector 41 different according to the specifications, the specifications of the solenoid valve 11 and the manifold solenoid valve 10 can be confirmed.

The relay connector 41 includes a plus common type relay connector 41a and a minus common type relay connector 41b. The board assembly 42 includes a double-wiring board assembly 42a and a single-wiring board assembly 42b. By combining any of the two types of relay connectors 41a, 41b and any of the two types of board assemblies 42a, 42b, the valve base 15 is set to, as shown in Table 1, any one of the four specifications of the plus common type double solenoid valve, the plus common type single solenoid valve, the minus common type double solenoid valve, and the minus common type single solenoid valve.

As described above, in order to exteriorly indicate which of the four specifications the solenoid valve 11 constituting the manifold solenoid valve 10 is, the plus common type relay connector 41a connected to the double-wiring board assembly 42a is colored green, and the plus common type relay connector 41a connected to the single-wiring board assembly 42b is colored blue. Further, the minus common type relay connector 41b connected to the double-wiring board assembly 42a is colored gray, and the minus common type relay connector 41b connected to the single-wiring board assembly 42b is colored pink.

The relay connectors 41, which have been color-coded into the four specifications, are colored by pigments contained in resin materials when each of the relay connectors 41 is resin-molded. As described above, by sharing the resin parts of both the relay connectors 41a, 41b, both the relay connectors 41a, 41b can be manufactured from the relay connectors 41 indicating the four specifications by using one type of resin molding dies, so that manufacturing efficiency of the relay connector can be improved.

In addition to this, since the specifications of the valve base 15 are displayed by the relay connector 41, it is not necessary to provide the symbol and character, etc. indicating the mold according to each specification on the valve base and to manufacture the valve base with one type of molding dies. Consequently, the manufacturing efficiency of the valve base is improved, and the assembly efficiency of the manifold solenoid valve 10 is improved. The specifications displayed by the relay connector 41 are not limited to the number of solenoids of the solenoid valve 11 and the wiring specifications of the manifold solenoid valve 10. For example, specifications such as a shape, a function, performance, using parts, and corresponding standards of the manifold solenoid valve 10 or the mountable solenoid valve 11 may be displayed.

Since the exposed claw 57, which is a portion exposed to the through hole 55, is visually recognized from exteriorly via the through hole 55, the specifications of the solenoid valve 11 and the wiring specifications of the manifold solenoid valve 10 are can be identified from exteriorly according to the color of the exposed claw 57. Further, in assembling the manifold solenoid valve 10, the type of the relay connector 41 to be assembled to the valve base 15 needs to be distinguished according to the type of the solenoid valve 11, but the type can be distinguished by the color and the assembly efficiency can be improved.

As shown in FIG. 5, the exposed claw 57 is one, and the engaging claw 58 is formed by two parts each having a width dimension smaller than that of the exposed claw 57. Further, since the width dimension of the engaging claw 58 is smaller than that of the through hole 55, the engaging claw 58 is not engaged with the through hole 55. In this way, by making the exposed claws 57 and the engaging claws 58 mutually different in shape, the relay connector 41 is prevented from being erroneously assembled to the valve base 15 in assembling the relay connector 41 to the valve base 15, and the assembling workability is improved.

TABLE 1

| | PLUS COMMON TYPE | | MINUS COMMON TYPE | |
|---|---|---|---|---|
| SOLENOID VALVE 11 | DOUBLE SOLENOID VALVE 11a | SINGLE SOLENOID VALVE 11b | DOUBLE SOLENOID VALVE 11a | SINGLE SOLENOID VALVE 11b |
| RELAY CONNECTOR 41 | PLUS COMMON RELAY CONNECTOR 41a (FIRST RELAY CONNECTOR) | | MINUS COMMON RELAY CONNECTOR 41b (SECOND RELAY CONNECTOR) | |
| | GREEN | BLUE | GRAY | PINK |
| BOARD ASSEMBLY 42 | DOUBLE-WIRING BOARD ASSEMBLY 42a | SINGLE-WIRING BOARD ASSEMBLY 42b | DOUBLE-WIRING BOARD ASSEMBLY 42a | SINGLE-WIRING BOARD ASSEMBLY 42b |

As shown in FIGS. 4 and 5, the through hole 55 has an outer engaging face 55a engaged with a tip surface of the exposed claw 57, and the engaging recess 56 has an inner engaging face 56a engaged with the tip surface of the engaging claw 58. As shown in FIG. 5, a length L1 from a face of the valve base main body 20, on which the base portion 52 of the relay connector 41 abuts, to the outer engaging face 55a is set to be smaller than a length L2 to the inner engaging face 56a. In this way, since engaging positions of the relay connector 41 engaged with the outer engaging face 55a and the inner engaging face 56a are different, erroneous assembly of the relay connector 41 to the valve base 15 is prevented.

Figure 6:
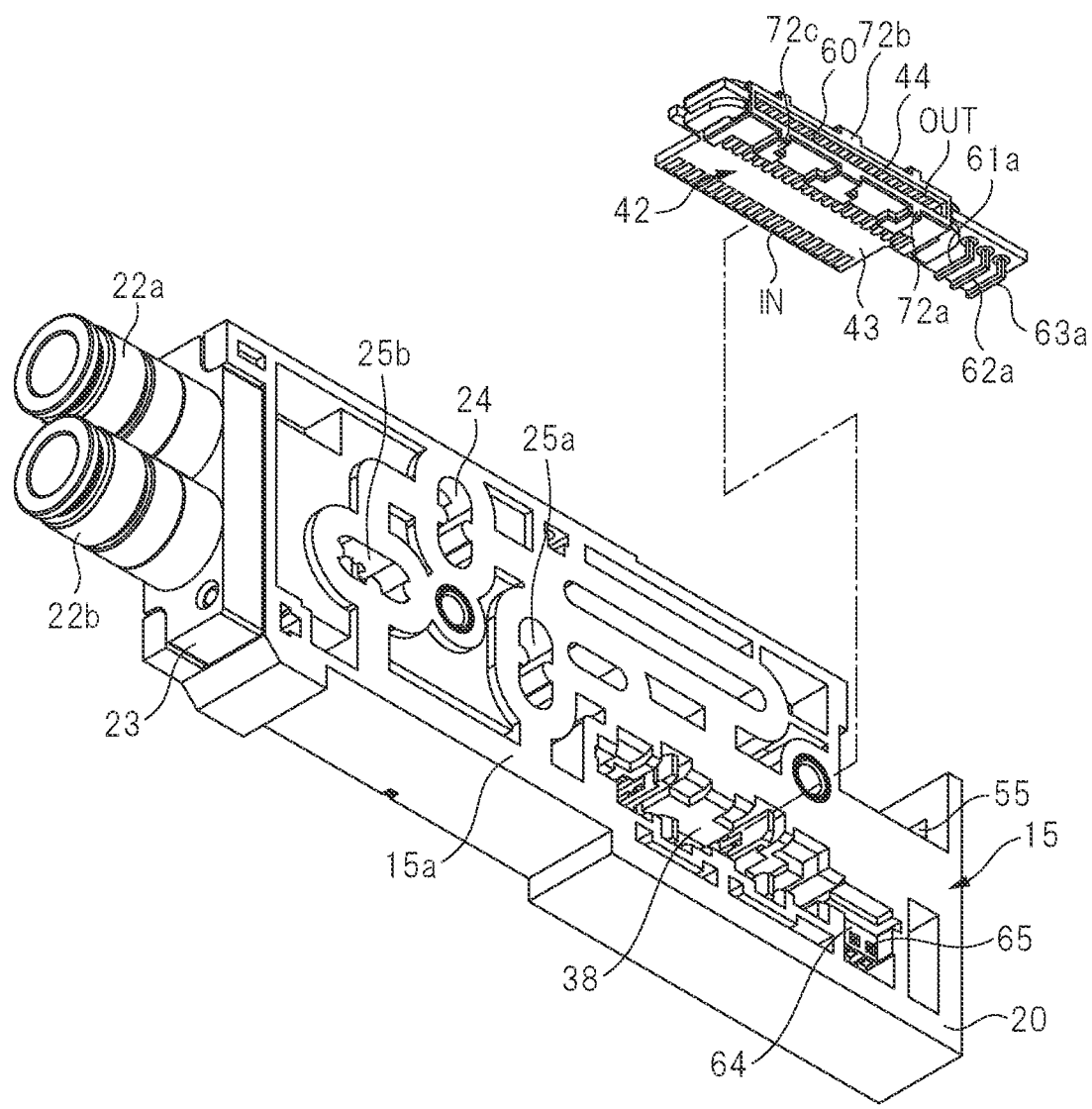
FIG. 6 is an enlarged perspective view which looks at the valve base from a bottom side.

As shown in FIGS. 5 and 6, one side surface of the valve base 15 is a board insertion face 15a, and the board assembly 42 is inserted into the board installing hole 38 from a board insertion face 15a side. A plurality of input terminals are linearly arranged on the side surface of the board 43 at regular intervals, and the input terminals are provided on both of front and back surfaces of the board 43. In FIGS. 5 and 6, one of the plurality of input terminals provided on both surfaces of the board 43 is denoted by the reference numeral IN.

The board connector 44 installed on the other side surface side of the board 43 has a slit 60 into which a board 43 of another adjacent board assembly 42 is inserted, and coupling terminals are linearly arranged on an inner surface of the slit 60 at regular intervals. In FIGS. 5 and 6, one of a plurality of input terminals provided on the inner surface of the slit 60 is denoted by the reference number OUT. When the board 43 of the other board assembly 42 is inserted into the board connector 44 of one board assembly 42, each input terminal IN provided on the board 43 of the other board assembly 42 is connected to each coupling terminal OUT of one board assembly 42.

Figure 10A:
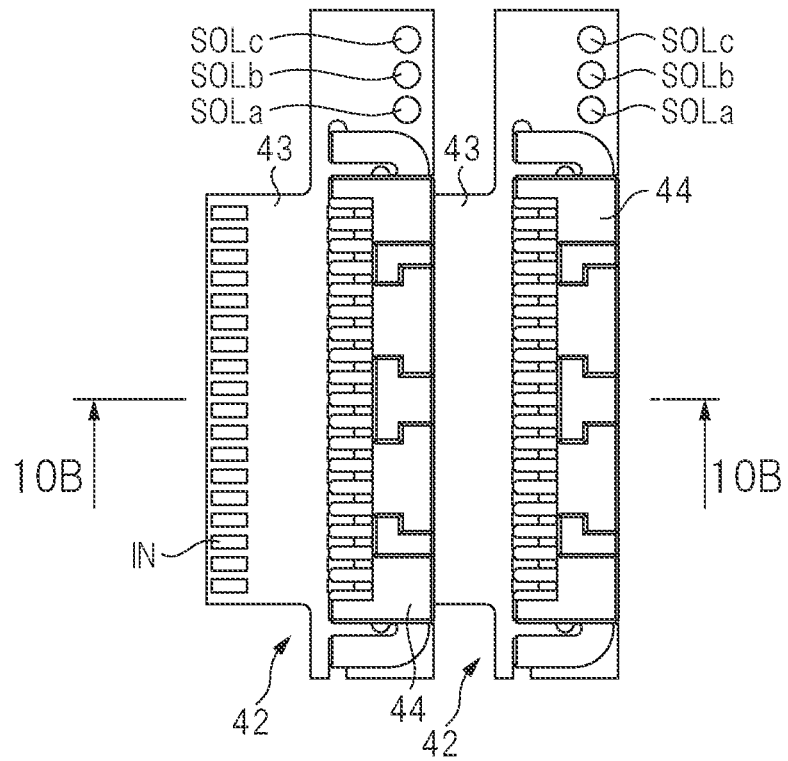
Figure 10B:
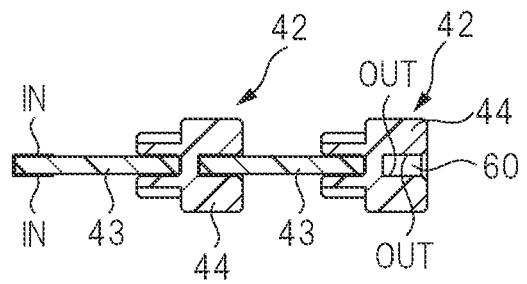
Figure 10C:
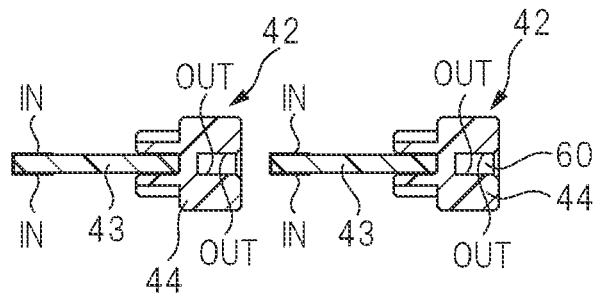

(A) of FIG. 10 is a plan view showing a state in which the two board assemblies 42 are combined. The one board connector 44 is upward and downward provided with a plurality of coupling terminals OUT so as to be exposed to the slit 60, and the input terminals IN connected to the coupling terminals OUT by a coupling wiring 46d are provided on both front and back surfaces of the board 43. Therefore, when the board 43 of the other board assembly 42 is inserted into the slit 60 of the board connector 44 of the one board assembly 42, the coupling terminal OUT is connected to the input terminal IN.

Incidentally, the input terminal IN and the common input terminal INc may be provided on the board connector 44, and the coupling terminal OUT and the common coupling terminal OUTc may be provided on the board 43.

Figure 11:
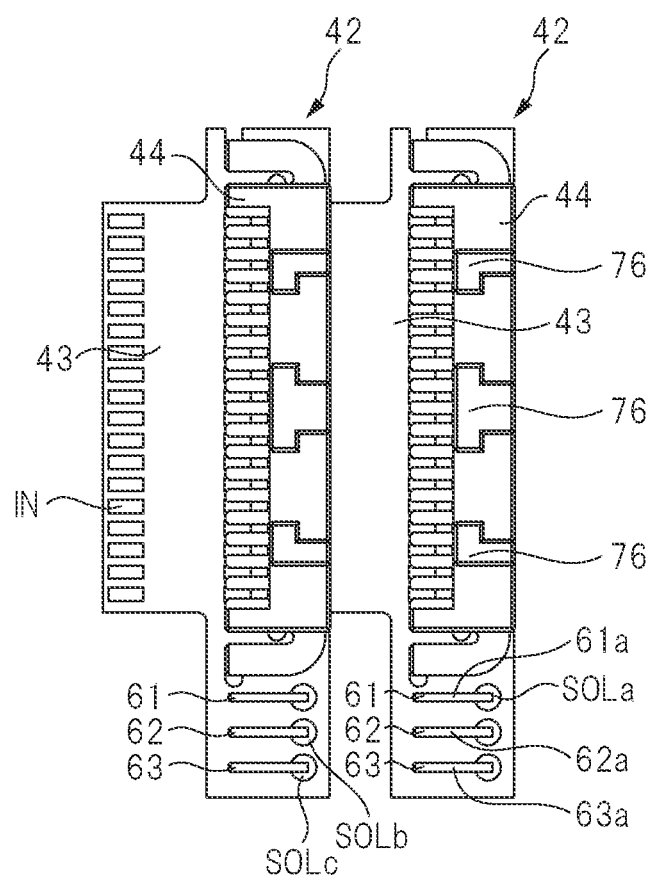
FIG. 11 is a back view of FIG. 10(A)

The first output terminal SOLa, the second output terminal SOLb, and the third output terminal SOLc as described above are provided at the end portion of the board 43. As shown in FIG. 11, a first output pin 61, a second output pin 62, and a third output pin 63 connected to conductors serving as output terminals are installed on the back surface side of the board 43. Each of the output pins 61 to 63 has an L-shape, which protrudes from the back surface of the board 43 and has insertion portions 61a to 63a extending in parallel with the board 43 in a width direction of the board assembly 42, thereby constituting an output terminal.

As shown in FIGS. 5 and 6, a pin support portion 64 is provided on the valve base main body 20, and the pin support portion 64 is provided with three pin insertion holes 65 correspondingly to the three output pins 61 to 63. Therefore, when the board assembly 42 is attached to the board installing hole 38, the respective output pins 61 to 63 are inserted into the pin insertion holes 65.

FIG. 7 shows one side surface 15b of the valve base 15, and this side surface 15b is a surface opposite to the board insertion face 15a. In each pin insertion portion 65, one end portion of a lead wire 66 is attached to each pin insertion hole 65 from a surface opposite to the pin insertion hole 65, and the other end portion of the lead wire 66 is attached to the board-side connection portion of the relay connector 41. Consequently, the output pin 61 as the first output terminal is connected to the first board-side connection portion A of the relay connector 41, and the output pin 62 as the second output terminal is connected to the second board-side connection portion B, and the output pin 63 as the third output terminal is connected to the third board-side connector portion COM.

The board assembly 42b of the single solenoid valve 11b may have a form of being not provided with the output pin 62, or may be provided with the output pin 62 as a dummy.

Figure 12A:
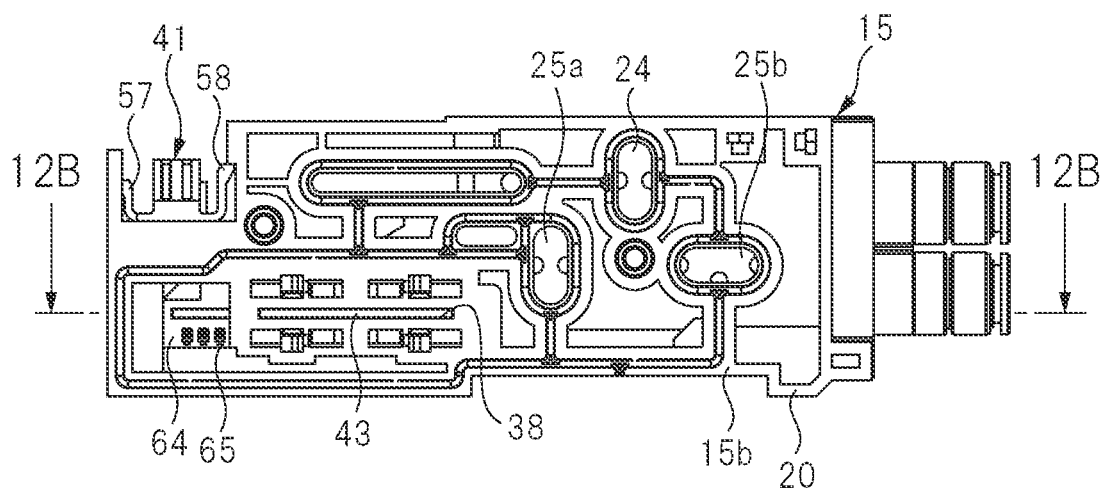
Figure 12B:
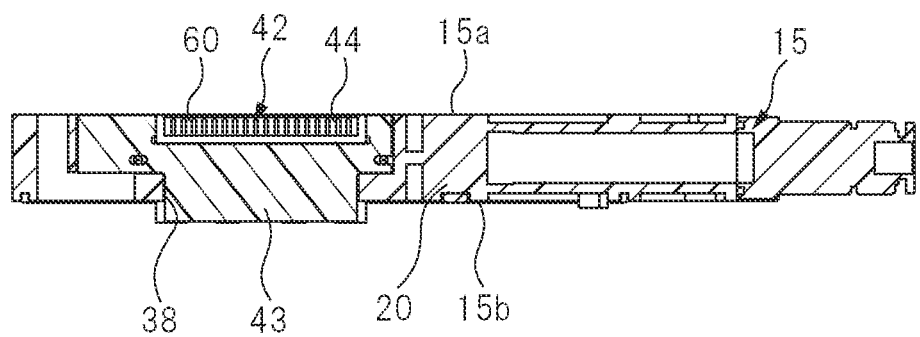

(A) of FIG. 12 shows a side surface 15b of the valve base 15, and (B) of FIG. 12 is a cross-sectional view taken along line 12B-12B in (A) of FIG. 12. When the board assembly 42 is attached to the board installing hole 38, as shown in (B) of FIG. 12, a portion of the coupling terminal provided on the side surface side of the board 43 protrudes from a side surface 15b of the valve base 15. A side surface of the board connector 44 becomes substantially flush with the board insertion surface 15a of the valve base 15 and is exposed exteriorly. When the valve bases 15 to be respectively attached to the board assemblies 42 are abutted against each other on their side surfaces, the board 43 of the other board assembly is inserted into the slit 60 of the one board connector 44.

Figure 13:
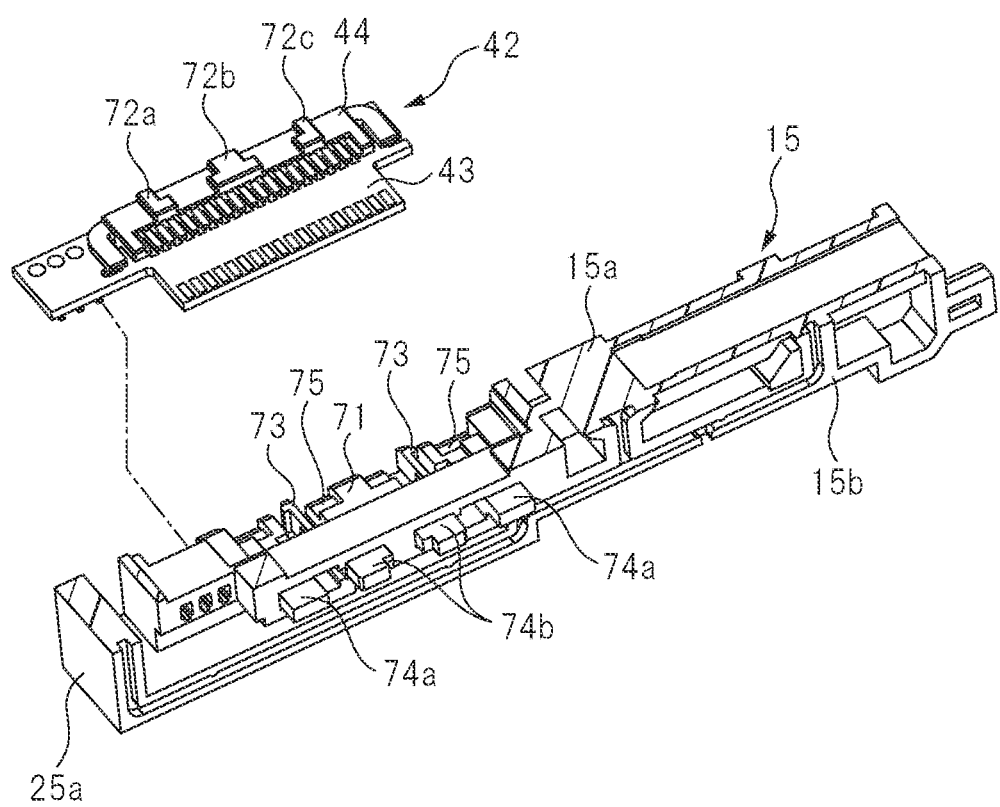
FIG. 13 is a partly-notched perspective view of the valve base in which the valve base is notched at a portion of a board installing hole, and shows a surface to which the board assembly is attached.

As shown in FIGS. 5 and 13, a plurality of engaging protrusions 72a to 72c are provided on the surface of the board connector 44. The engaging protrusions 72a and 72c have line-symmetrical L-shapes, and the engaging protrusion 72b has a T-shape. As shown in FIG. 6, the back surface of the board connector 44 is also provided with engaging projections 72a to 72c. When the board assembly 42 is attached to the board installing hole 38, the engaging claws 73 engaged with the engaging protrusions 72a, 72c are provided on the valve base main body 20 as shown in FIG. 5. By engaging the engaging claws 73 with the engaging projections 72a, 72c, the board assembly 42 is positioned at and fixed to a predetermined position on the valve base main body 20.

As shown in FIGS. 11 and 13, a board connector support face 71 is provided on the valve base 15, and a base contact face 76 is provided on each of the engaging projections 72a to 72c. When the board assembly 42 is attached to board installing hole 38, the base contact surface 76 abuts against and is supported by the board connector support face 71, and the board assembly 42 is positioned at a predetermined position of the valve base main body 20. In this way, the board connector 44 supports the board assembly 42 by abutting against the valve base 15.

As shown in FIG. 13, a plurality of protrusion portions 74a, 74b project from the side surface 15b and are provided on the valve base main body 20. The protrusion portion 74a is a quadrangular protrusion, and the protrusion portion 74b is an L-shaped protrusion. Recesses 75, into which the protrusion portions 74 of the adjacent board assembly 42 are inserted correspondingly to the respective protrusion portions 74a, 74b, are opened to the board insertion face 15a and are provided in the valve base main body 20. Further, a shape of the protrusion portion 74b is a shape corresponding to the engaging protrusion 72b, and is inserted between the engaging protrusion 72b and the engaging claw 73. Consequently, when the side surfaces are brought into contact with each other and the plurality of valve bases 15 are abutted against each other, the adjacent valve bases 15 becomes a state where the protrusion portions 74 are meshed with each other and the adjacent valve bases 15 are combined with each other in a predetermined positional relationship.

The present invention is not limited to the above-described embodiments, and can be variously modified within a range not departing from the scope thereof. The solenoid valve 11 may be not an indirectly actuated type in which pilot air is controlled by the pilot solenoid valve to drive the main valve shaft but a directly actuated type in which the valve body is directly driven by the solenoid. A stop valve for stopping the supply of air to each of the solenoid valves 11, an air supply block for supplying air directly to each of the solenoid valves 11, an exhaust block for exhausting air from each of the solenoid valves 11, or the like may be provided between the solenoid valve 11 and the valve base 15, and the solenoid valves 11 may be mounted on the valve bases 15 without abutting against the valve base 15. Further, a block plate for sealing the supply communication holes 26, the output communication holes 27a, 27b, and the exhaust communication holes 28a, 28b may be mounted on the valve base 15 without mounting the solenoid valve 11 on the valve base 15.

INDUSTRIAL APPLICABILITY

The manifold solenoid valve has the valve bases and is used in a technical field of using the pneumatically actuated device in order to control the supply of compressed air to the pneumatically actuated device.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. A manifold solenoid valve having at least one solenoid valve unit that includes a solenoid valve provided with at least one solenoid and a valve base mounting the solenoid valve, the manifold solenoid valve comprising:
    a board provided with a plurality of output terminals that are electrically connected to a terminal of the solenoid;
    a board connector provided on the board and forming a board assembly by a combination with the board;
    a plurality of input terminals provided on the board assembly at intervals;
    a plurality of coupling terminals provided on the board assembly at intervals;
    an output wiring provided on the board assembly and connecting the output terminals and the input terminals; and
    a coupling wiring provided on the board assembly and connecting the coupling terminals to the input terminals;
    wherein on the valve base a board installing hole to which the board assembly is attached is formed;
    the plurality of coupling terminals are connected to an input terminal of another adjacent board assembly;
    a plurality of output pins that are inserted into a pin insertion hole formed in the valve base and that form the output terminals are provided on the board assembly; and
    the plurality of output pins have an insertion portion extending in width direction of the board in parallel with the board, and when the board assembly is inserted into the board installing hole, the insertion portion is inserted into the pin insertion hole.

2. The manifold solenoid valve according to claim 1, wherein a plurality of solenoid valves are provided in the solenoid valve unit and at least one of the solenoid valves has two of a first solenoid and a second solenoid, and
the board assembly has:
    a first output pin serving as an output terminal to which one solenoid terminal of the first solenoid is connected;
    a second output pin serving as an output terminal to which one solenoid terminal of the second solenoid is connected;
    a third output pin serving as a common output terminal to which the other terminal of each of the two solenoids is connected; and
    a common coupling terminal connected to the third output pin by each of a common input terminal and a common coupling wiring.

3. The manifold solenoid valve according to claim 1, wherein at least one of the solenoid valves provided in the solenoid valve unit has a single solenoid, and
the board assembly has:
    a first output pin serving as an output terminal connected to one solenoid terminal of the solenoid;
    a second output pin serving as a common output terminal connected to the other terminal; and
    a common input terminal and a common coupling terminal each connected to the second output pin by a common coupling wiring.

4. The manifold solenoid valve according to claim 1, further comprising a relay connector attached to the valve base,
wherein the relay connector includes:
    a solenoid-side connection portion to which a terminal of the solenoid is connected; and
    a board-side connection portion connected to the solenoid-side connection portion by an internal wiring and connected to the output pin.

5. A valve base forming a manifold solenoid valve that solenoid valves each provided with at least one solenoid are mounted on, the solenoid valves being stricken against each other, the valve base comprising:
    a valve base main body on which a solenoid valve mounting face, a pin insertion hole, a board installing hole penetrating in a width direction are formed;
    a board assembly having a board provided with a plurality of output terminals electrically connected to a terminal of the solenoid and a board connector provided on the board, and attached to the board installing hole;
    a plurality of input terminals provided on the board assembly at intervals;
    a plurality of coupling terminals provided on the board assembly at intervals;
    an output wiring provided on the board assembly and connecting the output terminals and the input terminals; and
    a coupling wiring provided on the board assembly and connecting the coupling terminals to the input terminals;
    wherein the plurality of coupling terminals are connected to an input terminal of another adjacent board assembly;

a plurality of output pins inserted into the pin insertion hole and forming the output terminals are provided on the board assembly; and the plurality of output pins have an insertion portion extending in width direction of the board in parallel with the board, and when the board assembly is inserted into the board installing hole, the insertion portion is inserted into the pin insertion hole.

6. The valve base according to claim 5, wherein when the board assembly is inserted into the board installing hole from a side surface of the valve base, the insertion portion is inserted into the pin insertion hole.

7. The valve base according to claim 5, wherein the board assembly attached to the valve base on which the solenoid valve having two of a first solenoid and a second solenoid is mounted has:
- a first output pin serving as an output terminal to which one solenoid terminal of the first solenoid is connected;
- a second output pin as an output terminal to which one solenoid terminal of the second solenoid is connected;
- a third output pin serving as a common output terminal to which the other solenoid terminal of each of the two solenoids is connected; and
- a common coupling terminal connected to the third output terminal by each of a common input terminal and a common coupling wiring.

8. The valve base according to claim 5, wherein the board assembly attached to the valve base on which the solenoid valve having a single solenoid is mounted has:
- a first output pin serving as an output terminal connected to one solenoid terminal of the solenoid;
- a second output pin serving as a common output terminal connected to the other terminal; and
- a common input terminal and a common coupling terminal each connected to the second output pin by a common coupling wiring.

9. The valve base according to claim 7, further comprising a relay connector attached to the valve base, wherein the relay connector has:
- a first internal wiring connecting the first output pin and the one solenoid terminal of the first solenoid;
- a second internal wiring connecting the second output pin and the one solenoid terminal of the second solenoid; and
- a third internal wiring connecting the third output pin and the other solenoid terminal of each of the two solenoids.

10. The valve base according to claim 8, further comprising a relay connector attached to the valve base, wherein the relay connector has:
- a first internal wiring connecting the first output pin and the one solenoid terminal; and
- a second internal wiring connecting the second output pin and the other solenoid terminal.

11. The valve base according to claim 5, further comprising:
- an engaging protrusion provided on the board connector; and
- an engaging claw provided on the valve base,
- wherein the engaging protrusion and the engaging claw are engaged with each other to position the board assembly.

12. The valve base according to claim 11, wherein the engaging protrusion has a base contact face that contacts with a board connector support face of the valve base, and positions the board assembly by a contact between the board connector support face and the base contact face.

13. The manifold solenoid valve according to claim 1, when the board assembly is inserted into the board installing hole from a side surface of the valve base, the insertion portion is inserted into the pin insertion hole.

* * * * *